US009262655B2

(12) United States Patent
Baranowski

(10) Patent No.: US 9,262,655 B2
(45) Date of Patent: *Feb. 16, 2016

(54) SYSTEM AND METHOD FOR ENHANCED RFID INSTRUMENT SECURITY

(71) Applicant: QUALCOMM FYX, Inc., San Diego, CA (US)

(72) Inventor: James A. Baranowski, Scottsdale, AZ (US)

(73) Assignee: QUALCOMM FYX, INC., San Diego, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 14/184,524

(22) Filed: Feb. 19, 2014

(65) Prior Publication Data

US 2014/0169566 A1 Jun. 19, 2014

Related U.S. Application Data

(63) Continuation of application No. 13/568,621, filed on Aug. 7, 2012, now Pat. No. 8,698,595, which is a continuation of application No. 13/242,810, filed on Sep. 23, 2011, now Pat. No. 8,264,321, which is a (Continued)

(51) Int. Cl.
*G06K 7/10* (2006.01)
*H04W 12/06* (2009.01)
*H04L 9/32* (2006.01)

(52) U.S. Cl.
CPC .......... *G06K 7/10257* (2013.01); *H04L 9/3271* (2013.01); *H04W 12/06* (2013.01); *H04L 2209/805* (2013.01)

(58) Field of Classification Search
CPC . H04L 9/327; H04L 2209/805; H04W 12/06; G06K 7/10257
USPC ................................................. 340/5.61, 10.1
See application file for complete search history.

(56) References Cited

U.S. PATENT DOCUMENTS 5,068,894 A 11/1991 Hoppe
5,288,978 A 2/1994 Iijima (Continued)

FOREIGN PATENT DOCUMENTS

JP 03001289 1/1991
JP 06068647 3/1994

(Continued)

OTHER PUBLICATIONS

Bruce Schneier, Applied Cryptography, 1996, John Wiley & Sons, Inc., New York, NY, USA.

(Continued)

*Primary Examiner* — Edwin Holloway, III
(74) *Attorney, Agent, or Firm* — Joseph Hanasz

(57) ABSTRACT

A system and method for using an RFID read/write device to secure an RFID operable instrument or an RF communication is provided. The invention includes security databases in communication with a processor for storing and communicating security protocols to the RFID read/write device. The invention includes a method for restricting the unauthorized use of an RFID read/write device. The invention includes a subscription service for communicating user credentials to a certificate authority to obtain a counter security protocol. The invention also includes decrypting information stored on an RF operable device or transmitted via radio-frequency using counter security protocols.

30 Claims, 4 Drawing Sheets

Related U.S. Application Data continuation of application No. 10/908,767, filed on May 25, 2005, now Pat. No. 8,049,594.

(60) Provisional application No. 60/632,027, filed on Nov. 30, 2004.

(56) References Cited

U.S. PATENT DOCUMENTS

| | | |
|---|---|---|
| 5,310,999 A | 5/1994 | Claus et al. |
| 5,331,138 A | 7/1994 | Saroya |
| 5,339,447 A | 8/1994 | Balmer |
| 5,349,357 A | 9/1994 | Schurmann et al. |
| 5,350,906 A | 9/1994 | Brody et al. |
| 5,351,052 A | 9/1994 | D'Hont et al. |
| 5,351,142 A | 9/1994 | Cueli |
| 5,355,411 A | 10/1994 | MacDonald |
| 5,359,522 A | 10/1994 | Ryan |
| 5,365,551 A | 11/1994 | Snodgrass et al. |
| 5,371,896 A | 12/1994 | Gove et al. |
| 5,373,303 A | 12/1994 | D'Hont |
| 5,383,687 A | 1/1995 | Suess et al. |
| 5,397,881 A | 3/1995 | Mannik |
| 5,407,893 A | 4/1995 | Koshizuka et al. |
| 5,408,243 A | 4/1995 | D'Hont |
| 5,410,142 A | 4/1995 | Tsuboi et al. |
| 5,410,649 A | 4/1995 | Gove |
| 5,412,192 A | 5/1995 | Hoss |
| 5,428,363 A | 6/1995 | D'Hont |
| 5,438,184 A | 8/1995 | Roberts et al. |
| 5,453,601 A | 9/1995 | Rosen |
| 5,453,747 A | 9/1995 | D'Hont et al. |
| 5,461,217 A | 10/1995 | Claus |
| 5,461,219 A | 10/1995 | Cronvall |
| 5,471,592 A | 11/1995 | Gove et al. |
| 5,477,038 A | 12/1995 | Levine et al. |
| 5,477,040 A | 12/1995 | Lalonde |
| 5,478,629 A | 12/1995 | Norman |
| 5,479,494 A | 12/1995 | Clitherow |
| 5,479,530 A | 12/1995 | Nair et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | D'Hont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | D'Hont |
| 5,500,513 A | 3/1996 | Langhans et al. |
| 5,500,651 A | 3/1996 | Schuermann |
| 5,503,434 A | 4/1996 | Gunn |
| 5,504,808 A | 4/1996 | Hamrick, Jr. |
| 5,506,395 A | 4/1996 | Eppley |
| 5,513,272 A | 4/1996 | Bogosian, Jr. |
| 5,513,525 A | 5/1996 | Schuermann |
| 5,514,860 A | 5/1996 | Berson |
| 5,516,153 A | 5/1996 | Kaule |
| 5,518,810 A | 5/1996 | Nishihara et al. |
| 5,519,381 A | 5/1996 | Marsh et al. |
| 5,544,246 A | 8/1996 | Mandelbaum et al. |
| 5,590,038 A | 12/1996 | Pitroda |
| 5,602,919 A | 2/1997 | Hurta et al. |
| 5,629,981 A * | 5/1997 | Nerlikar ............... 713/168 |
| 5,692,132 A | 11/1997 | Hogan |
| 5,705,852 A | 1/1998 | Orihara et al. |
| 5,710,421 A | 1/1998 | Kokubu |
| 5,715,399 A | 2/1998 | Bezos |
| 5,720,500 A | 2/1998 | Okazaki et al. |
| 5,721,781 A | 2/1998 | Deo et al. |
| 5,724,424 A | 3/1998 | Gifford |
| 5,725,098 A | 3/1998 | Seifert et al. |
| 5,727,140 A | 3/1998 | Ohtomo et al. |
| 5,727,696 A | 3/1998 | Valiulis |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | D'Hont et al. |
| 5,734,838 A | 3/1998 | Robinson et al. |
| 5,737,439 A | 4/1998 | Lapsley et al. |
| 5,739,512 A | 4/1998 | Tognazzini |
| 5,742,756 A | 4/1998 | Dillaway et al. |
| 5,742,845 A | 4/1998 | Wagner |
| 5,745,571 A | 4/1998 | Zuk |
| 5,748,137 A | 5/1998 | D'Hont |
| 5,748,737 A | 5/1998 | Daggar |
| 5,757,917 A | 5/1998 | Rose et al. |
| 5,758,195 A | 5/1998 | Balmer |
| 5,761,306 A | 6/1998 | Lewis |
| 5,761,493 A | 6/1998 | Blakeley et al. |
| 5,764,789 A | 6/1998 | Pare, Jr. et al. |
| 5,768,385 A | 6/1998 | Simon |
| 5,768,609 A | 6/1998 | Gove et al. |
| 5,769,457 A | 6/1998 | Warther |
| 5,770,843 A | 6/1998 | Rose et al. |
| 5,773,812 A | 6/1998 | Kreft |
| 5,774,882 A | 6/1998 | Keen et al. |
| 5,777,903 A | 7/1998 | Piosenka et al. |
| 5,778,067 A | 7/1998 | Jones et al. |
| 5,778,069 A | 7/1998 | Thomlinson et al. |
| 5,778,173 A | 7/1998 | Apte |
| 5,785,680 A | 7/1998 | Niezink et al. |
| 5,786,587 A | 7/1998 | Colgate, Jr. |
| 5,789,733 A | 8/1998 | Jachimowicz et al. |
| 5,791,474 A | 8/1998 | Hansen |
| 5,792,337 A | 8/1998 | Padovani et al. |
| 5,793,324 A | 8/1998 | Aslanidis et al. |
| 5,794,095 A | 8/1998 | Thompson |
| 5,796,831 A | 8/1998 | Paradinas et al. |
| 5,797,060 A | 8/1998 | Thompson |
| 5,797,085 A | 8/1998 | Beuk et al. |
| 5,797,133 A | 8/1998 | Jones et al. |
| 5,798,709 A | 8/1998 | Flaxl |
| 5,799,087 A | 8/1998 | Rosen |
| 5,806,045 A | 9/1998 | Biorge et al. |
| 5,808,758 A | 9/1998 | Solmsdorf |
| 5,857,152 A | 1/1999 | Everett |
| 5,870,723 A | 2/1999 | Pare, Jr. et al. |
| 5,884,271 A | 3/1999 | Pitroda |
| 5,886,634 A | 3/1999 | Muhme |
| 5,950,179 A | 9/1999 | Buchanan et al. |
| 5,988,497 A | 11/1999 | Wallace |
| 6,041,410 A | 3/2000 | Hsu et al. |
| 6,046,683 A | 4/2000 | Pidwerbetsky et al. |
| 6,058,476 A | 5/2000 | Matsuzaki et al. |
| 6,070,156 A | 5/2000 | Hartsell, Jr. |
| 6,073,236 A | 6/2000 | Kusakabe et al. |
| 6,073,840 A | 6/2000 | Marion |
| 6,078,888 A | 6/2000 | Johnson, Jr. |
| 6,089,284 A | 7/2000 | Kaehler et al. |
| 6,101,477 A | 8/2000 | Hohle et al. |
| 6,104,281 A | 8/2000 | Heinrich et al. |
| 6,105,008 A | 8/2000 | Davis et al. |
| 6,112,984 A | 9/2000 | Snavely |
| 6,185,307 B1 | 2/2001 | Johnson, Jr. |
| 6,257,486 B1 | 7/2001 | Teicher et al. |
| 6,295,522 B1 | 9/2001 | Boesch |
| 6,304,974 B1 | 10/2001 | Samar |
| 6,313,737 B1 | 11/2001 | Freeze et al. |
| 6,317,721 B1 | 11/2001 | Hurta et al. |
| 6,317,755 B1 | 11/2001 | Rakers et al. |
| 6,332,134 B1 | 12/2001 | Foster |
| 6,366,220 B1 | 4/2002 | Elliott |
| 6,422,462 B1 | 7/2002 | Cohen |
| RE37,822 E | 8/2002 | Anthonyson |
| 6,439,455 B1 | 8/2002 | Everett et al. |
| 6,442,532 B1 | 8/2002 | Kawan |
| D462,965 S | 9/2002 | Pentz |
| D462,966 S | 9/2002 | Pentz et al. |
| 6,445,794 B1 | 9/2002 | Shefi |
| 6,446,862 B1 | 9/2002 | Mann |
| 6,457,000 B1 | 9/2002 | Witkowski et al. |
| 6,457,996 B1 | 10/2002 | Shih |
| 6,460,696 B1 | 10/2002 | Meyer |

(56) References Cited

U.S. PATENT DOCUMENTS

| | | |
|---|---|---|
| 6,466,804 B1 | 10/2002 | Pecen et al. |
| 6,471,127 B2 | 10/2002 | Pentz et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,480,825 B1 | 11/2002 | Sharma et al. |
| 6,480,869 B1 | 11/2002 | Fujioka |
| 6,481,621 B1 | 11/2002 | Herrendoerfer et al. |
| 6,481,623 B1 | 11/2002 | Grant et al. |
| 6,481,632 B2 | 11/2002 | Wentker et al. |
| 6,483,427 B1 | 11/2002 | Werb |
| 6,483,477 B1 | 11/2002 | Plonka |
| 6,483,929 B1 | 11/2002 | Murakami et al. |
| 6,484,937 B1 | 11/2002 | Devaux et al. |
| 6,490,443 B1 | 12/2002 | Freeny, Jr. |
| 6,490,680 B1 | 12/2002 | Scheidt et al. |
| 6,491,229 B1 | 12/2002 | Berney |
| 6,491,639 B1 | 12/2002 | Turcott |
| 6,494,367 B1 | 12/2002 | Zacharias |
| 6,494,380 B2 | 12/2002 | Jarosz |
| 6,496,594 B1 | 12/2002 | Prokoski |
| 6,501,832 B1 | 12/2002 | Saylor et al. |
| 6,505,772 B1 | 1/2003 | Mollett et al. |
| 6,507,662 B1 | 1/2003 | Brooks |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,519,565 B1 | 2/2003 | Clements et al. |
| 6,520,542 B2 | 2/2003 | Thompson et al. |
| 6,523,292 B2 | 2/2003 | Slavik |
| 6,529,880 B1 | 3/2003 | McKeen et al. |
| 6,535,726 B1 | 3/2003 | Johnson |
| 6,539,101 B1 | 3/2003 | Black |
| 6,546,373 B1 | 4/2003 | Cerra |
| 6,547,133 B1 | 4/2003 | Devries, Jr. et al. |
| 6,549,912 B1 | 4/2003 | Chen |
| D474,234 S | 5/2003 | Nelms et al. |
| 6,560,581 B1 | 5/2003 | Fox et al. |
| 6,575,361 B1 | 6/2003 | Graves et al. |
| 6,577,229 B1 | 6/2003 | Bonneau et al. |
| 6,609,658 B1 | 8/2003 | Sehr |
| 6,624,752 B2 | 9/2003 | Klitsgaard et al. |
| 6,639,514 B1 | 10/2003 | Muller |
| 6,654,883 B1 | 11/2003 | Tatebayashi |
| 6,664,897 B2 | 12/2003 | Pape et al. |
| 6,671,358 B1 | 12/2003 | Sossaman, II et al. |
| 6,676,023 B2 | 1/2004 | Shinoda |
| 6,677,852 B1 | 1/2004 | Landt |
| 6,704,608 B1 | 3/2004 | Azuma |
| 6,725,202 B1 | 4/2004 | Hurta et al. |
| 6,753,759 B2 | 6/2004 | Stegmaier et al. |
| 6,771,981 B1 | 8/2004 | Zalewski et al. |
| 6,772,981 B1 | 8/2004 | Yu |
| 6,774,811 B2 | 8/2004 | Kaufman et al. |
| 6,779,726 B1 | 8/2004 | Easton |
| 6,786,400 B1 | 9/2004 | Bucci |
| 6,788,205 B1 | 9/2004 | Mason et al. |
| 6,799,726 B2 | 10/2004 | Stockhammer et al. |
| 6,809,645 B1 | 10/2004 | Mason |
| 6,816,075 B2 | 11/2004 | Grunes et al. |
| 6,825,767 B2 | 11/2004 | Humbard |
| 6,826,607 B1 | 11/2004 | Gelvin et al. |
| 6,832,251 B1 | 12/2004 | Gelvin et al. |
| 6,842,106 B2 | 1/2005 | Hughes et al. |
| 6,857,566 B2 | 2/2005 | Wankmueller |
| 6,915,277 B1 | 7/2005 | Manchester et al. |
| 6,925,565 B2 | 8/2005 | Black |
| 6,978,369 B2 | 12/2005 | Wheeler et al. |
| 7,006,993 B1 | 2/2006 | Cheong et al. |
| 7,136,835 B1 | 11/2006 | Flitcroft et al. |
| 7,136,836 B1 | 11/2006 | Washizuka et al. |
| 7,184,747 B2 | 2/2007 | Bogat |
| 7,287,695 B2 | 10/2007 | Wankmueller |
| 7,289,970 B1 | 10/2007 | Siegel |
| 7,363,505 B2 | 4/2008 | Black |
| 7,419,093 B1 | 9/2008 | Blackson et al. |
| 8,049,594 B1 | 11/2011 | Baranowski |
| 8,264,321 B2 * | 9/2012 | Baranowski ............... 340/5.61 |
| 8,698,595 B2 * | 4/2014 | Baranowski ............... 340/5.61 |
| 2001/0000019 A1 | 3/2001 | Bowers et al. |
| 2001/0000430 A1 | 4/2001 | Smith et al. |
| 2001/0008390 A1 | 7/2001 | Berquist et al. |
| 2001/0032310 A1 | 10/2001 | Corella |
| 2001/0034623 A1 | 10/2001 | Chung |
| 2001/0034720 A1 | 10/2001 | Armes et al. |
| 2002/0005774 A1 | 1/2002 | Rudolph et al. |
| 2002/0008621 A1 | 1/2002 | Barritz et al. |
| 2002/0013765 A1 | 1/2002 | Shwartz |
| 2002/0026575 A1 | 2/2002 | Wheeler et al. |
| 2002/0043566 A1 | 4/2002 | Goodman et al. |
| 2002/0062251 A1 | 5/2002 | Anandan et al. |
| 2002/0070862 A1 | 6/2002 | Francis et al. |
| 2002/0087867 A1 | 7/2002 | Oberle et al. |
| 2002/0128980 A1 | 9/2002 | Ludtke et al. |
| 2002/0158751 A1 | 10/2002 | Bormaster |
| 2002/0186133 A1 | 12/2002 | Loof |
| 2002/0188863 A1 | 12/2002 | Friedman |
| 2002/0191816 A1 | 12/2002 | Maritzen et al. |
| 2003/0001459 A1 | 1/2003 | Scott |
| 2003/0005310 A1 | 1/2003 | Shinzaki |
| 2003/0006878 A1 | 1/2003 | Chung |
| 2003/0014505 A1 | 1/2003 | Ramberg et al. |
| 2003/0018893 A1 | 1/2003 | Hess et al. |
| 2003/0043040 A1 | 3/2003 | Zeps et al. |
| 2003/0043041 A1 | 3/2003 | Zeps et al. |
| 2003/0043042 A1 | 3/2003 | Moores et al. |
| 2003/0052788 A1 | 3/2003 | Kwong-Tai Chung et al. |
| 2003/0058110 A1 | 3/2003 | Rich |
| 2003/0058113 A1 | 3/2003 | Neidig et al. |
| 2003/0128100 A1 | 7/2003 | Burkhardt et al. |
| 2003/0149662 A1 | 8/2003 | Shore |
| 2003/0167207 A1 * | 9/2003 | Berardi et al. ................. 705/16 |
| 2003/0174099 A1 | 9/2003 | Bauer et al. |
| 2003/0214387 A1 | 11/2003 | Giaccherini |
| 2004/0008114 A1 | 1/2004 | Sawyer |
| 2004/0032330 A1 | 2/2004 | Hoffman |
| 2004/0044627 A1 | 3/2004 | Russell et al. |
| 2004/0066278 A1 * | 4/2004 | Hughes et al. .............. 340/10.1 |
| 2004/0066279 A1 | 4/2004 | Hughes et al. |
| 2004/0069851 A1 | 4/2004 | Grunes et al. |
| 2004/0095241 A1 | 5/2004 | Maloney |
| 2004/0095244 A1 | 5/2004 | Conwell et al. |
| 2004/0100363 A1 | 5/2004 | Lane et al. |
| 2004/0112957 A1 | 6/2004 | Elledge |
| 2004/0113783 A1 | 6/2004 | Yagesh |
| 2004/0124982 A1 | 7/2004 | Kovach |
| 2004/0129787 A1 | 7/2004 | Saito et al. |
| 2004/0155778 A1 | 8/2004 | Shek et al. |
| 2004/0174261 A1 | 9/2004 | Volpi et al. |
| 2004/0206810 A1 | 10/2004 | Yamagiwa |
| 2004/0222878 A1 | 11/2004 | Juels |
| 2004/0233040 A1 | 11/2004 | Lane et al. |
| 2004/0236680 A1 | 11/2004 | Luoffo et al. |
| 2005/0065872 A1 | 3/2005 | Moebs et al. |
| 2005/0073964 A1 * | 4/2005 | Schmidt et al. ............. 370/260 |
| 2005/0099269 A1 | 5/2005 | Diorio et al. |
| 2005/0125317 A1 | 6/2005 | Winkelman, III |
| 2005/0232471 A1 | 10/2005 | Baer |
| 2006/0077034 A1 | 4/2006 | Hillier |
| 2006/0109109 A1 * | 5/2006 | Rajapakse et al. ........ 340/539.13 |
| 2006/0178937 A1 | 8/2006 | Rau et al. |
| 2007/0192602 A1 * | 8/2007 | Blom et al. .................. 713/169 |
| 2012/0300933 A1 | 11/2012 | Baranowski |

FOREIGN PATENT DOCUMENTS

| | | |
|---|---|---|
| JP | H08202842 A | 8/1996 |
| JP | H08241387 A | 9/1996 |
| JP | H10302160 A | 11/1998 |
| JP | H10312485 A | 11/1998 |
| JP | H11252069 A | 9/1999 |
| JP | 2000137774 A | 5/2000 |
| JP | 2000312267 A | 11/2000 |

(56) References Cited

FOREIGN PATENT DOCUMENTS

| | | |
|---|---|---|
| JP | 2001338251 A | 12/2001 |
| JP | 2001357362 A | 12/2001 |
| JP | 2002006061 A | 1/2002 |
| JP | 2002024914 A | 1/2002 |
| JP | 2002049942 A | 2/2002 |
| JP | 2002099859 A | 4/2002 |
| JP | 2002109210 A | 4/2002 |
| WO | WO-9828877 A1 | 7/1998 |
| WO | WO-0122351 A1 | 3/2001 |
| WO | WO-2004006064 A2 | 1/2004 |

OTHER PUBLICATIONS

Carey, Gordon, "Multi-tier Capay," Pharmaceutical Executive, Feb. 2000.

Core One Credit Union—Discover the Advantage, http://coreone.org/2visa.html, Copyright 2001 (last visited Oct. 9, 2002).

Credit Card Offer Travelers New Benefit, PR Newswire, Aug. 5, 1987.

Crumbaugh, Darlene M., "Effective Marketing Positions: Check card as consumer lifeline," Hoosier Banker, Apr. 1998, p. 10, vol. 82, Issue 4.

Deborah S. Ray et al., Mastering HTML 4.0, 1997, Sybex, San Francisco, CA, USA.

Dilip C. Naik, Internet Standards and Protocols, 1998, Microsoft Press, Redmond, WA, USA.

EP; Summons to Attend Oral Proceedings dated Aug. 30, 2011 in Application No. 02748120.9.

Gabber, et al., "Agora: A Minimal Distributed Protocol for Electronic Commerce," USENIX Oakland, CA, Nov. 18, 1996.

Gemma O'Sullivan Ed., Java 2 Complete, 1999, Sybex, San Francisco, CA, USA.

Gilbert Held, Understanding Data Communications, 2002, Seventh Edition, Addison-Wesley, Boston, MA, USA.

Goldwasser, Joan, "Best of the Cash-Back Cards," Kiplinger's Personal Finance Magazine, Apr. 1999.

Inside's next Gen Smart Card: The French company plans to introduce an RFID card that uses a 16-bit microprocessor and new encryption technology, RFID Journal, Oct. 29, 2002.

Kuntz, Mary, "Credit Cards as Good as Gold," Forbes, Nov. 4, 1985.

Lahey, Liam, "Microsoft Bolsters Rebate Structure," Computer Dealer News, Feb. 8, 2002.

Lamond, "Credit Card Transactions Real World and Online," Copyright 1996.

Men Ezes, et al., "Handbook of Applied Cryptography," 1997, CRC Press, Chapter 10.

Muller, "Desktop Encyclopedia of the Internet," 1999, Artech House Inc., Norwood, MA, all pages.

New Evidence about Positive Three-Tier Co-Pay Performance Presented at Express Scripts 2000 Outcomes Conference, PR Newswire Association, Inc., Jun. 28, 2000.

Nyman, Judy, "Free Income Tax Clinics are Opening as Apr. 30 Deadline Draws Nearer," The Toronto Star, Final Edition, Mar. 25, 1986.

Obel, Michael, "Oil Companies Push Marketing, Cost Cutting to Fortify Earnings," Oil & Gas Journal, Sep. 16, 1985.

Palowireless, "What is Bluetooth?" Jan. 29, 2001 (retrieved from archive.org ), Palowireless Bluetooth Resource Center, available at http://www.palowireless.com/infotooth/whatis.aps [corrected submission].

Palowireless, "What is Bluetooth?" Palowireless Bluetooth Resource Center, available at http://www.palowireless.com/infotooth/whatis aps (retrieved Jun. 15, 2010).

Pete Loshin, TCP/IP Clearly Explained, 1997, Second Edition, Academic Press, San Diego, CA, USA.

Prestige Credit Cards: Those Pricey Plastics, Changing Times, Apr. 1986.

Schmuckler, Eric, "Playing Your Cards Right," Forbes, Dec. 28, 1987.

Shell Introduces Optional Credit Card, The Associated Press, Sep. 3, 1985.

Shell Introducing Expanded 'Signature' Credit Card, Tulsa Business Chronicle, Sep. 5, 1985.

Shell-Oil: Introduces Shell Signature Travel and Entertainment Credit Card, Business Wire, Sep. 3, 1985.

The Bank Credit Card Business, American Bankers Association, 1996, all pages.

The Chase Manhattan Bank Today Announced a Comprehensive Program to Enhance the Value of All of its Credit Cards, PR Newswire, Dec. 18, 1986.

\* cited by examiner

SYSTEM AND METHOD FOR ENHANCED RFID INSTRUMENT SECURITY

CROSS-REFERENCE TO RELATED APPLICATIONS

This application is a continuation application of application Ser. No. 13/568,621, entitled "SYSTEM AND METHOD FOR ENHANCED RFID INSTRUMENT SECURITY," filed Aug. 7, 2012, which is a continuation application of application Ser. No. 13/242,810, entitled "SYSTEM AND METHOD FOR ENHANCED RFID INSTRUMENT SECURITY," filed Sep. 23, 2011, which is a continuation application of application Ser. No. 10/908,767, now U.S. Pat. No. 8,049,594, entitled "SYSTEM AND METHOD FOR ENHANCED RFID INSTRUMENT SECURITY," filed May 25, 2005, and claims priority to and the benefit of U.S. Provisional Application Ser. No. 60/632,027, entitled "SYSTEM AND METHOD FOR ENHANCED RFID INSTRUMENT SECURITY" filed Nov. 30, 2004, all of which are assigned to the assignee hereof and incorporated herein by reference in their entirety for all purposes.

FIELD OF INVENTION

This invention generally relates to securely reading and writing information on an RFID instrument which may include, for example, a transponder or tag. The invention includes methods and systems for preventing the unauthorized use of an RFID read/write device or tampering with the contents of an RFID instrument.

BACKGROUND OF THE INVENTION

Advanced technologies have allowed RFID read/write capability to be affordable and highly portable. Essentially anyone with a laptop/PDA will soon be able to process RFID tags and the information stored thereon. However, situations exist where either the contents of an RFID tag should be unreadable or should be unalterable.

Contactless cards are also becoming more and more prevalent. These cards use radio frequencies (RF) and are used for identification and/or other transactions. Instead of a card reader extracting the card number from a magnetic stripe or accessing a card number in a remote database, radio frequencies between the card and the reader exchange the associated payment information such as, for example, a credit card account number. These contactless chips are incorporated into or associated with various form factors such as, for example, cards, keychain fobs, watches, jewelry, and various other forms of devices.

In general, both RFID tags and contactless cards use wireless links between the device and a reader. The wireless link is provided through radio signals that typically carry data either uni-directionally or bi-directionally. When an RFID tag or a contactless card enters a read zone, its data is captured by the reader and may then be transferred through standard interfaces to a host computer for storage or action. Various forms of RF technology enable RFID tags and contactless cards to be powered and allow the cards to be effective at certain ranges.

Contactless cards are currently secured in a similar manner to magnetic-stripe cards, namely, through their possession by the owner. But as technology becomes easier for unauthorized people to obtain, this approach becomes increasingly risky. Limited technology is available for securing the information stored on the RFID tags. For example, since both contactless card data and RFID tag data are passed to the reader through a wireless interface, this data could be captured by others who place a recording device tuned to the same wireless frequency. When this recording device (e.g. a stolen reader, a "Spider-box," or any device built from readily-available components) is placed in close proximity to the contactless card and/or RFID tag it can be used to power the device thereby creating a false transaction. These recording devices may also be placed at a far greater distance from the location where the device is being used for a valid transaction and eavesdrop on the data being transmitted via RF transmission. That is, the increasingly available technology has enabled the creation of false portable RFID readers which are moved from location to location to eavesdrop on RFID transmissions. These scenarios are distinctly different from other commonly used payment devices such as common magnetic stripe transaction cards because the recording devices for wireless products may obtain the card data without ever coming into direct contact or possession of the card itself. As such, a need exists for a secure use of RFID tags and contactless cards, if the devices are to remain viable information and payment instruments that are trusted by consumers.

SUMMARY OF THE INVENTION

Described herein is a system and method for securing RFID transactions which address the problems found in conventional transaction securing methods. The present invention includes a Radio Frequency (RF) transaction securing system and method using an RFID read/write device that communicates with both a processor and a radio frequency identification (RFID)-operable instrument. The invention includes security databases in communication with the processor, for storing and communicating security protocols to the RFID read/write device.

In another embodiment of the present invention, unauthorized use of an RFID read/write device is restricted. For example, a RFID read/write device may employ user credentials to communicate with a certificate authority to obtain a counter security protocol to decrypt information communicated from an RF-operable instrument to the REID read/write device.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings.

DETAILED DESCRIPTION

Figure 1:
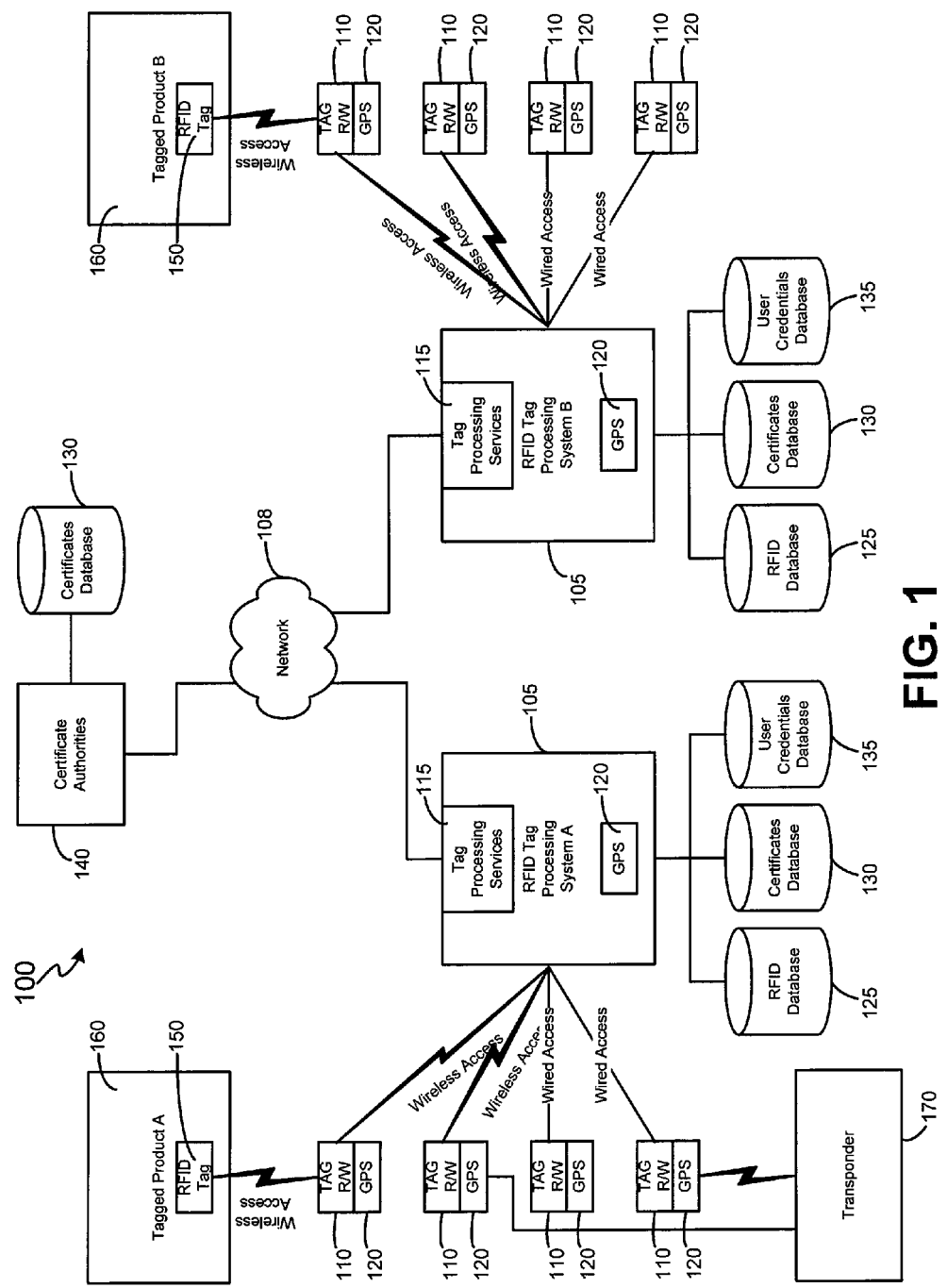
FIG. 1 illustrates an exemplary RFID-based security system depicting exemplary components for use in securing REID transactions and devices in accordance with one embodiment of the invention.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments can be realized and that logical and mechanical changes can be made without departing from the spirit and scope of the invention. Thus, the detailed description herein is presented for purposes of illustration only and not of limitation. For example, the steps recited in any of the method or process descriptions can be executed in any order and are not limited to the order presented.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections are present in a practical system.

The present invention is described herein in terms of functional block components, screen shots, optional selections and various processing steps. Such functional blocks are realized by any number of hardware components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention can be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the Internet, an intranet, an extranet, WAN, LAN, satellite communications, and/or the like. It is noted that the network is implemented as other types of networks, such as an interactive television network (ITN).

An exemplary enhanced RFID security system 100 is configured to achieve seamless (or substantially seamless) security for RFID systems by providing security protocols and systems for many (if not all) forms of RFID communication. For example, system 100 provides security for various RFID devices, including, for example, an RFID tag 150, a transponder 170 and/or an RFID read/write device 110. System 100 also provides secure RF and/or traditional communication transactions between any device communicating within the system. System 100 includes one or more tag processing systems 105 (TPS) configured to facilitate enhanced security throughout an RFID system. TPS 105 are configured to communicate by wireless, optical, copper, and/or other communication means with one or more read/writable RFID read/write devices 110. Each RFID read/write device 110 communicates with one or more RFID tags 150 attached to various products 160 and/or with one or more transponders 170.

In one embodiment, each TPS 105 is configured with a tag processing service 115 and a global positioning system (GPS) 120 capability. TPS 105 is additionally configured to communicate with one or more databases, such as, for example, an RFID database 125, a certificates database 130 and a user credentials database 135 to facilitate communication of security protocols, such as, for example, digital keys, encryption information, decryption information and the like. TPS 105 may also communicate with one or more digital certificate authorities 140 through network 108 to facilitate communication of security protocols.

TPS 105 is configured to provide a standard method and system for securely reading and writing information on RFID tags 150 or transponders 170. Further, TPS 105 is configured to deter the unauthorized and/or fraudulent use of RFID read/write devices 110. Further still, TPS 105 is configured to deter tampering with the contents of RFID tag 150.

In one exemplary embodiment, TPS 105 employs one or more protocols for defining a means for securely reading and/or writing information on RFID tag 150. TPS 105 is also configured to combine protocols and/or other security elements to increase the difficulty for unauthorized use of RFID read/write devices 110. TPS 105 is also configured to combine protocols and/or other security elements to prevent tampering with the contents of RFID tag 150 and/or transponder 170.

While FIG. 1 depicts two TPS 105 systems, system 100 contemplates one or multiple TPS 105 systems working together and/or separately, along with one or more of any of the components discussed herein. For example, in one embodiment, TPS 105 system A may operate remotely, while TPS 105 system B may operate locally. However, both systems A and B are configured to work as one TPS 105 system. In another embodiment, TPS systems A and B operate independently as separate systems and/or in a cooperative manner as separate systems (e.g., in a subscription service relationship, as described herein).

For example, one of the benefits of a subscription service is that the encryption mechanism is not revealed outside of the system that is hosting/providing the service (e.g., tag processing service 115). Further, with a subscription service, enhanced security is maintained through every step. In one embodiment, every user of RFID tags 150 and/or RFID read/write devices 110 communicating with system 100 provides authentication credentials in order to operate tags 150 and/or devices 110. In addition, every system (i.e., system 115) and/or user that subscribes to the service first registers for the service and receives credentials for performing transactions via the service. In an exemplary embodiment of a service transaction, a user on the subscribing system uses RFID device 110 to scan RFID tag 150 with encrypted data, device 110 sends the data to the subscribing system using a secured protocol such as HTIPS, the subscribing system authenticates to the service provider system via a web service secured using a protocol such as HTIPS, the service provider system decrypts the data and returns the result to the subscribing system, and the subscribing system returns the result to RFID device 110 using a secured protocol (e.g., HTIPS). This method is described in greater detail herein.

RFID read/write device 110 is any device capable of reading and/or writing radio-frequency transmitted information. In one embodiment, RFID read/write device 110 is configured as an RFID reader for use in contactless transactions. In another embodiment, RFID read/write device 110 is configured as portable and/or stationary scanner for use in RFID tag 150 communication in, for example, a factory. In one embodiment, RFID read/write device 110 is configured as a FIPS (Federal Information Processing Standards)-compliant and/or tamper-resistant device that is used for various security functions. For example RFID read/write device 110 is configured as a FIPS-complaint device that requires authorization before use. As another example, RFID read/write device 110 is authorized by being programmed with a digital certificate stored in another FIPS-compliant device to activate it for use.

In another embodiment, RFID read/write device 110 is configured with a GPS device 120 (described below) to facilitate location-based security features. For example, RFID read/write device 110 is configured to deactivate if it is moved from a specific geographical range. RFID read/write device 110 may also be configured to store, for example, Wired Equivalent Privacy (WEP), Wi-Fi Protected Access (WPA), and/or WPA2 keys. Thus, RFID read/write device 110 is able to implement a variety of secure wireless systems and/or protocols. In another embodiment, RFID read/write device 110 is also configured to store other RFID read/write device 110 configuration data such as, for example, Lightweight Extensible Authentication Protocol (LEAP), firewall information, HTTPS information and/or any other security information. By configuring RFID read/write device 110 with a GPS device 120, in one embodiment, the invention contemplates the use of GPS to prevent or limit unauthorized use of RFID reader/writer device 110. The invention further contemplates, placing GPS device 120 in a FIPS 20-compliant (or similar) device and/or the combination of the security protocols, GPS, and authentication processes described herein. For example, in one embodiment, configuring an RFID read/write device 110 with GPS device 120 includes storing a digital certificate in a FIPS 20-compliant storage medium inside each RFID read/write device 110 and using that certificate to identify RFID read/write device 110 to system 100.

RFID tag 150 is configured as either an active or passive tag. Passive RFID tag 150 is configured without its own power supply, instead, the incoming radio-frequency signal induces a small electrical current in a passive RFID tag antenna. This small electrical current is used to send a response from RFID tag 150 to RFID read/write device 110. Generally passive RFID tags 150 are configured to transmit a limited amount of information such as, for example, an ID number and/or product information. Active RFID tag 150 is configured with a power source and has larger ranges and/or memories than a passive RFID tag 150. Active RFID tags 150 may also be configured to store information sent by RFID read/write device 110, as well as more expansive identification information, product information, and the like. As used herein, RFID tags 150 refer to both passive and active tags, and include low frequency tags (between 125 to 134 kilohertz), high frequency tags (13.56 megahertz), UHF tags (868 to 956 megahertz), microwave tags (2.45 gigahertz), and/or any other frequency or type of RFID tags.

An RFID instrument may include, for example, a RFID tag or an RFID transponder. As used herein, the term "RF-operable tag" may refer to both RFID tags 150 as well as transponders 170. Transponder 170 includes, in one embodiment, an antenna for receiving an interrogation signal from RFID read/write device 110 via an internal or antenna external antenna. In one embodiment, transponder 170 is a 13.56 MHz transponder compliant with the ISO/IEC 14443 standard, and transponder 170 antenna is of the 13 MHz variety. Transponder 170 is in communication with a transponder compatible modulator/demodulator configured to receive the signal from transponder 170 and configured to modulate the signal into a format readable by any later connected circuitry. Further, the modulator/demodulator is configured to format (e.g., demodulate) a signal received from the later connected circuitry in a format compatible with transponder 170 for transmitting to RFID read/write device 110 via the antenna. For example, where transponder 170 is of the 13.56 MHz variety, the modulator/demodulator is ISO/IEC 14443-2 compliant. Transponder 170 may also be configured for near field communication. See, for example, Sony's "Near Field Communication" ("NFC") emerging standard which is touted as operating on 13.56 MHz and allowing the transfer of any kind of data between NFC enabled devices and across a distance of up to twenty centimeters. See also, Bluetooth chaotic network configurations; described in more detail in "What is Bluetooth," Palowireless Bluetooth Resource Center, available at http://www.palowireless.com/infotooth/whatis.asp, which is incorporated herein by reference. Furthermore, data on a first transponder 170 is transmitted directly or indirectly to a second transponder 170 to create a copy of all or part of the original device.

In certain embodiments, transponder 170 is contained on any portable form factor. Typical devices may include, for example, a key ring, tag, card, fob, cell phone, wristwatch or any other device capable of being presented for interrogation. In some instances, a battery is included to power transponder 170 in which case the internal circuitry of transponder 170 may draw its operating power from the battery power source. Alternatively, transponder 170 may exist independent of an internal power source. In this instance, the internal circuitry of the transponder may gain its operating power directly from an RF interrogation signal. U.S. Pat. No. 5,053,774, issued to Schuermann, incorporated herein by reference, describes such a transponder RF interrogation system. The Schuermann patent describes in general the powering technology surrounding conventional transponder structures. U.S. Pat. No. 4,739,328, also incorporated herein by reference, discusses a method by which a conventional transponder may respond to a RF interrogation signal. Other typical modulation techniques which are used include, for example, ISO/IEC 14443 and the like.

In the conventional powering technologies, transponder 170 is typically activated upon presenting transponder 170 in an interrogation signal. In this regard, transponder 170 is activated irrespective of whether the user desires such activation. Inadvertent presentation of transponder 170 may result in initiation and completion of an unwanted transaction. Thus, a security system is needed which allows the fob user to control activation of transponder 170 to limit transactions being undesirably completed.

RFID read/write device 110, transponder 170 and/or RFID tags 150 are configured to store and/or communicate transaction and/or security information. For example, RFID read/write device 110, transponder 170 and/or RFID tags 150 may include transaction and/or security information such as, for example, a manufacturer ID, a product ID, UPC information, a product description, a creation date of the device/tag information, an expiration date of the device/tag information (when it becomes invalid), encrypted data, one or more digital signatures, write once read many (WORM) capability, and/or additional non-encrypted data (i.e., random numbers, counters, etc.).

Products 160, as used herein, include any type of product (e.g., a Frisbee or shirt), good, person, animal, object, document, computing device, tag, vehicle, or the like. For example, in one embodiment, products 160 may comprise grocery items. In another embodiment, products 160 comprise sensitive and/or other important documents (such as a patent). In yet another embodiment, products 160 is a person or livestock.

Tag processing services 115 is configured to facilitate enhanced RFID security by processing tag 150 and/or transponder 170 security information. For example, tag processing services 115 is configured to facilitate authenticating and authorizing external users via digital certificates, providing tag decryption and/or digital signature functions for authenticated and authorized users, and/or for providing inventorying functions for authenticated and authorized users.

GPS 120 is a receiver configured for worldwide radio-navigation. GPS 120 uses triangulation techniques to measure distances using the travel time of one or more radio signals. GPS 120 is used for locating and/or finding RFID read/write devices 110, transponder 170 and/or RFID tags 150. GPS 120 may also be used to prevent RFID devices 110, transponder 170 and/or RFID tags 150 from being used outside of a predetermined geographical boundary (for example, a store or a building.

The terms network 108, "Internet," or "network" may refer to the Internet, any replacement, competitor or successor to the Internet, or any public or private inter-network, intranet or extranet that is based upon open or proprietary protocols. Specific information related to the protocols, standards, and application software utilized in connection with the Internet may not be discussed herein. For further information regarding such details, see, for example, Dilip Naik, "Internet Standards and Protocols" (1998); "Java 2 Complete," various authors, (Sybex 1999); Deborah Ray and Eric Ray, "Mastering HTML 4.0" (1997); Loshin, "TCP/IP Clearly Explained" (1997). All of these texts are hereby incorporated by reference.

By communicating via radio frequency and/or traditional links, a signal may travel to/from one component to another. The components may be directly connected to each other or connected through one or more other devices or components. The various coupling components for the devices may include, for example, the Internet, a wireless network, a conventional wire cable, an optical cable or connection through air, water, or any other medium that conducts signals, and any other coupling device or medium.

Where desired, the system user may interact with the system via any input device such as, a keypad, keyboard, mouse, kiosk, personal digital assistant, handheld computer (e.g., Palm Pilot®, Blackberry®), cellular phone and/or the like. Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, OS/2, BeOS, Linux, UNIX, Solaris or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having similar functionality described herein.

A variety of conventional communications media and protocols are used for data links providing physical connections between the various system components. For example, the data links is an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system including the point-of-sale (POS) device and host network may reside on a local area network which interfaces to a remote network (not shown) for remote authorization of an intended transaction. The POS may communicate with the remote network via a leased line, such as a T1, D3 line, or the like. Such communications lines are described in a variety of texts, such as, "Understanding Data Communications," by Gilbert Held, which is incorporated herein by reference.

Certificate authorities 140 can be any type of hardware, or physical or digitally-based system that is used for obtaining security protocol information. For example, certificate authorities 140 are used to obtain and/or validate digital certificates, digital signatures, digital keys, and the like. Certificate authorities 140 are configured as a system that offers subscription services to a business or a distributing partner. For example, system A, a certificate authority, is a military contractor that produces highly sensitive products. System B is a distributor that works with system A to distribute A's products. System A may use RFID technology to store information about its products 160 for shipping and/or other purposes. System A, as a certificate authority, may store identity information on one or more certificates database 130, including digital certificates and private encryption keys, wherein the identity information is necessary to read the information stored on RFID tags 150 attached to system A's products 160. System B may then act as a subscriber and may contact system A certificate authority 140 to obtain the identity information necessary to validate system B and allow system B to read RFID tag 150 information.

RFID database 125 is a database that may be used as a repository for all RFID Tag 150 data and/or RFID read/write device 110 access control. For example, RFID database 125 may contain an inventory of all products 160, RFID tags 150, RFID read/write devices 110 and/or transponders 170 in system 100. RFID database 125 may also be configured to communicate with TPS 105 and/or any other database and/or computing system to facilitate product 160 inventory, control and/or management.

Certificates database 130 is configured to contain digital certificates. Certificates database 130 and/or the digital certificates are used for encryption, decryption, digital signatures, and/or creating encryption keys for secure wireless communications between elements in the RFID Tag Processing System 100. For example, certificates database 130 is used to validate digital certificates stored and/or communicated from GPS 120 devices, RFID read/write devices 110, transponders 170, and/or any other device in TPS 105 configured to use digital certificates. An exemplary method for securing RFID communications in TPS 105 using digital certificates is described in detail herein.

User credentials database 135 is a database that is used as a master repository for all valid/authorized internal users of TPS 105. User credentials database 135 may also be used as a master repository for all valid/authorized external users via tag processing services 115. For example, user credentials database 135 is configured to store identity information to authenticate business partners in the subscription service of certificate authority 140, described herein.

RFID database 125, certificates database 130, user credentials database 135 and/or any other databases discussed herein is any type of database, such as relational, hierarchical, object-oriented, and/or the like. Common database products that are used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Databases are organized in any suitable manner, including as data tables or lookup tables. Association of certain data is accomplished through any data association technique known and practiced in the art. For example, the association is accomplished either manually or automatically. Automatic association techniques may include, for example, a database search, a database merge, GREP, AGREP, SQL, and/or the like. The association step is accomplished by a database merge function, for example, using a "key field" in each of the manufacturer and retailer data tables. A "key field" partitions the database according to the high-level class of objects defined by the key field. For example, a certain class is designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Further still, various components are described herein in terms of their "validity." In this context, a "valid" component is authorized for use in completing a transaction request in accordance with the present invention. Contrarily, an "invalid" component is not authorized for transaction completion. In addition, an invalid component is not recognized as being permitted for use on the secure RF system described herein. Also, as used herein, a transaction request may include any type of request, for example, a financial transaction, a shipping transaction, an inventorying transaction, a security transaction, a tracking transaction, and the like.

In one exemplary embodiment, TPS 105, RFID read/write device 110, and/or tag processing services 115 is configured to employ HTIPS and/or any other secure protocol for communication transmissions. For example, in one embodiment, TPS 105, RFID read/write device 110, and/or tag processing services 115 is configured to secure communications between TPS 105 and RFID read/write device 110 using HTIPS protocols. In another exemplary embodiment, TPS 105, RFID read/write device 110, and/or tag processing services 115 are configured to use HTIPS protocols to facilitate securing communications between TPS 105 and other internal or external third-party systems connected to internal or external network 108. In yet another exemplary embodiment, TPS 105, RFID read/write device 110, and/or tag processing services 115 are configured to use HTIPS protocols to facilitate securing communications between RFID read/write device 110 and RFID tags 150 and/or transponder 170.

In another exemplary embodiment, TPS 105, RFID read/write device 110, transponder 170 and/or tag processing services 115 (collectively "processing devices") may also be configured to facilitate one or more process capabilities. For example, in one exemplary embodiment, the processing devices are configured to prevent unauthorized use of RFID read/write device 110. That, is processing devices are configured to use GPS 120 within their respective FIPS hardware to allow a base server to determine whether a read/write device communicating with system 100 is a valid (known) device and/or in a valid vicinity. Further, processing devices may also use their FIPS hardware to store RFID read/write device 110 and/or tag 150 identification data.

In another exemplary embodiment, the processing devices are configured to prevent sensitive parts of tag data from being read by an unauthorized user. For example, processing devices may use a base server to encrypt data before sending to RFID read/write device 110 for writing the data to tag 150.

In yet another exemplary embodiment, the processing devices are configured to prevent tag data from being altered by an unauthorized user. That is, the processing devices may write tag data to RFID read/write device 110 and/or tag 150 with an expiration date and/or with additional tag data which is either encrypted or digitally signed. An external user may then use tag processing services 115, TPS 105 and/or RFID read/write device 110 to authenticate the tag data and/or be authorized to verify the authenticity, integrity, and validity of the tag data.

Another exemplary embodiment of the present invention includes the processing devices configured to prevent tag data from being altered. For example, because tag 150 and/or transponder 170 is configured with write once read many (WORM) capability, tag data and/or transponder information is written with an expiration date that, along with other tag data, is either encrypted or digitally signed. As a result, an external user may use TPS 105 to verify the authenticity, integrity, and validity of the tag data/transponder data using TPS 105 authentication data.

Figure 2:
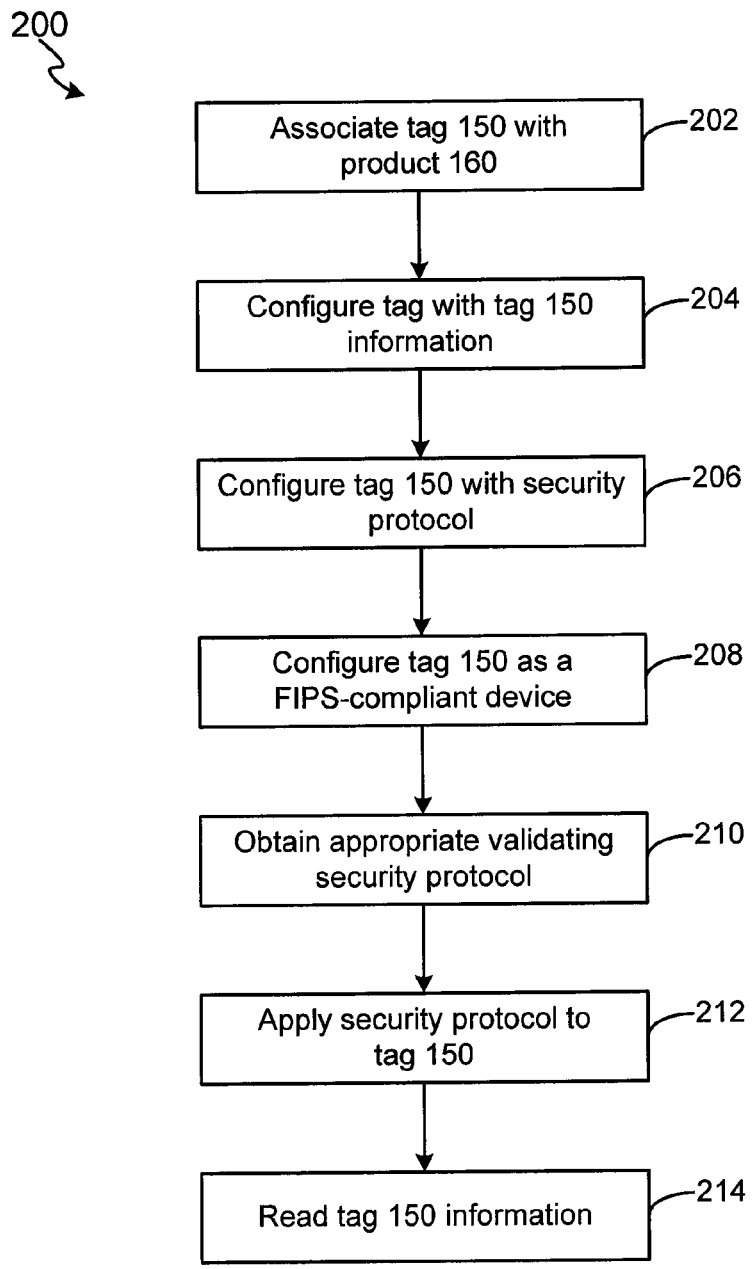
FIG. 2 illustrates an exemplary method for securing an RFID tag in accordance with one embodiment of the invention.

The operation of an exemplary embodiment described above, is understood with reference to FIG. 1 and to the method of securing RFID tag 150 and/or an RFID transponder 170 described in FIG. 2. While both RFID tag 150 and RFID transponder are secured in a similar manner, the process will be described in terms of securing RFID tag 150 for ease of explanation.

An exemplary method 200 of securing tag 150 may include tag 150 being affixed and/or associated with product 160 (step 202). By affixing and/or associating tag 150 with product 160, tag 150 is configured to store information regarding product 160, such as, for example, a manufacturer ID, UPC information, product information (include price and general descriptive information), and/or any other type of product information. RFID tag 150 may also be configured with tag 150-specific information (step 204). For example, RFID tag 150 is configured with a tag identifier, operability information, and the like. Tag 150 may additionally be configured with one or more security protocols (step 206). For example, tag 150 is configured to score security information. By being "configured," security information is encrypted and stored on tag 150. Such security information includes, for example, one or more digital certificates, digital certificates WEP keys, WPA keys, WPA2 keys, GPS 120 capabilities, and the like. In addition and/or alternately, tag 150 is configured as a FIPS-compliant device (step 208).

Once tag 150 has been configured with one or more security protocols, tag 150 data may only be read if the appropriate security processing device protocols are applied (step 214). For example, if tag 150 is configured with certain digital signatures, a processing device must access certificates database 130 to obtain the appropriate validating certificate (step 210). If tag 150 data has been secured by a vendor and/or system that is different from the processing device system, then the processing device may contact one or more certificate authority 140 to obtain a validating certificate from the appropriate certificates database 130. Once the appropriate security processing device protocol is obtained, the processing device may apply the protocol to tag 150 (step 212) to facilitate the communication of tag 150 data to the processing device.

The present invention may also be used to secure the communication of information over RF links. For example, with reference to FIG. 1 and reference to a method of securing a RF and/or traditional communication 300 described in FIG. 3, the operation is explained with respect to transponder 170 (although similar methods and steps for securing RF and/or traditional communication may apply to any device communicating within system 100). The method for securing an RF and/or traditional communication signal when transponder 170 is placed in an interrogation field is generated by RFID read/write device 110 (step 302). In response, transponder 170 may engage in secure mutual authentication with RFID read/write device 110 (step 304). By engaging in secure mutual authentication, transponder 170 and/or RFID read/write device 110 is/are configured to use one or more security protocols to secure the communication of information between the two devices during mutual authentication.

Figure 4:
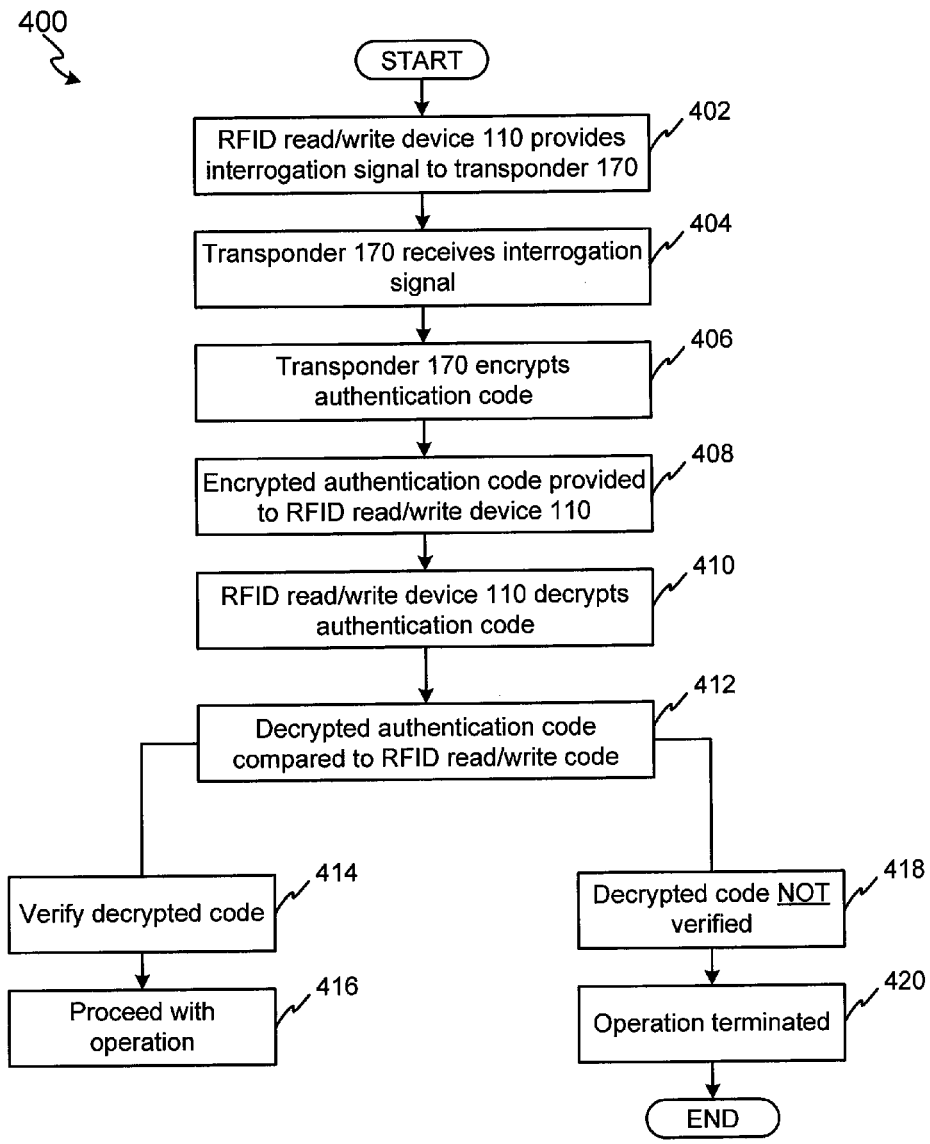
FIG. 4 illustrates an exemplary method for secure mutual authentication between RFID-operable devices in accordance with one embodiment of the invention.

For example, FIG. 4 is a flowchart of an exemplary authentication process 400. Authentication process 400 is depicted as one-sided. That is, the flowchart depicts the process of RFID read/write device 110 authenticating transponder 170, although similar steps are followed in the event that transponder 170 authenticates RFID read/write device 110. Further still, secure mutual authentication process 400 is described in terms of encrypting and/or decrypting security keys. However, the present invention contemplates authentication by way of encrypting and decrypting any type of security protocol. For example, the present invention contemplates the use of digital signatures, digital certificates, GPS information, WEP keys, WPA keys, WPA2 keys, identifier information, HTIPS protocols and the like.

As noted, transponder 170 is configured to store one or more security keys for encrypting or decrypting signals received from RFID read/write device 110. In an exemplary authentication process, where RFID read/write device 110 is authenticating transponder 170, RFID read/write device 110 may provide an interrogation signal to transponder 170 (step 402). The interrogation signal may include a random code generated by RFID read/write device 110, which is provided to transponder 170 and which is encrypted using a unique encryption key corresponding to transponder 170 unique identification/authentication code. The authentication code is an alphanumeric code which is recognizable (e.g., readable) by RFID read/write device 110 and transponder 170. The authentication code is provided to transponder 170 via RF and/or traditional communications link.

The interrogation signal, including the authorization code, is received by transponder 170 (step 404). Once transponder 170 is activated, the interrogation signal including the authorization code is recognized as a request for authentication of transponder 170. Transponder 170 may then encrypt the authentication code (step 406). Transponder 170 may then provide the encrypted authentication code to RFID read/write device 110 (step 408). That is, the encrypted authentication code is provided to RFID read/write device 110 via RF and/or traditional communication links.

RFID read/write device 110 may then receive the encrypted authentication code and decrypt it (step 410). That is, RFID read/write device 110 may use a security authentication key (e.g., transponder system decryption key) to facilitate decryption (e.g., unlocking) the encrypted authorization code. The authentication key is provided to RFID read/write device 110 based on a transponder 170 unique identification code. For example, the encrypted authentication code is provided along with a unique transponder 170 identification code. RFID read/write device 110 may thus use a decryption key correlative to the unique transponder 170 identification code for use in decrypting the encrypted authentication code.

Once the authentication code is decrypted, the decrypted authentication code is compared to the authentication code provided by RFID read/write device 110 at step 402 (step 412) to verify its authenticity. If the decrypted authorization code is not readable (e.g., recognizable), transponder 170 is deemed to be unauthorized (e.g., unverified) (step 418) and the operation is terminated (step 420). Contrarily, if the decrypted authorization code is recognizable (e.g., verified) by transponder 170, the decrypted authorization code is deemed to be authenticated (step 414), and the operation is allowed to proceed (step 416). In one particular embodiment, the proceeding transaction may mean that transponder 170 may authenticate RFID read/write device 110 prior to RFID read/write device 110 authenticating transponder 170, although, it should be apparent that RFID read/write device 110 may authenticate transponder 170 prior to transponder 170 authenticating RFID read/write device 110.

It should be noted that in an exemplary verification process, RFID read/write device 110 may determine whether the unlocked authorization code is identical (or similar) to the authorization code provided in step 402. If the codes are not identical then transponder 170 is not authorized. Although, the verification process is described with respect to being identical, being identical is not required. For example, RFID read/write device 110 may verify the decrypted code through any protocol, steps, or process for determining whether the decrypted code corresponds to an authorized transponder 170. For more information on mutual authentication, see commonly-owned U.S. patent application Ser. No. 10/340,352, filed Jan. 10, 2003, titled "SYSTEM AND METHOD FOR INCENTING PAYMENT USING RADIO FREQUENCY IDENTIFICATION IN CONTACT AND CONTACTLESS TRANSACTIONS," the contents of which are incorporated by reference in its entirety.

In accordance with the various embodiments described, the present invention addresses the problem of securing an RF transaction completed by an RFID transaction device. The invention provides a system and method for an account issuer to determine if the RFID transaction device is a valid device for completing a transaction on a RF transaction system. The account issuer may determine whether the transaction device is valid by verifying the transaction device counter, and encryption identifier. It should be noted, however, that the present invention contemplates various arrangements wherein the transaction device is validated.

Figure 3:
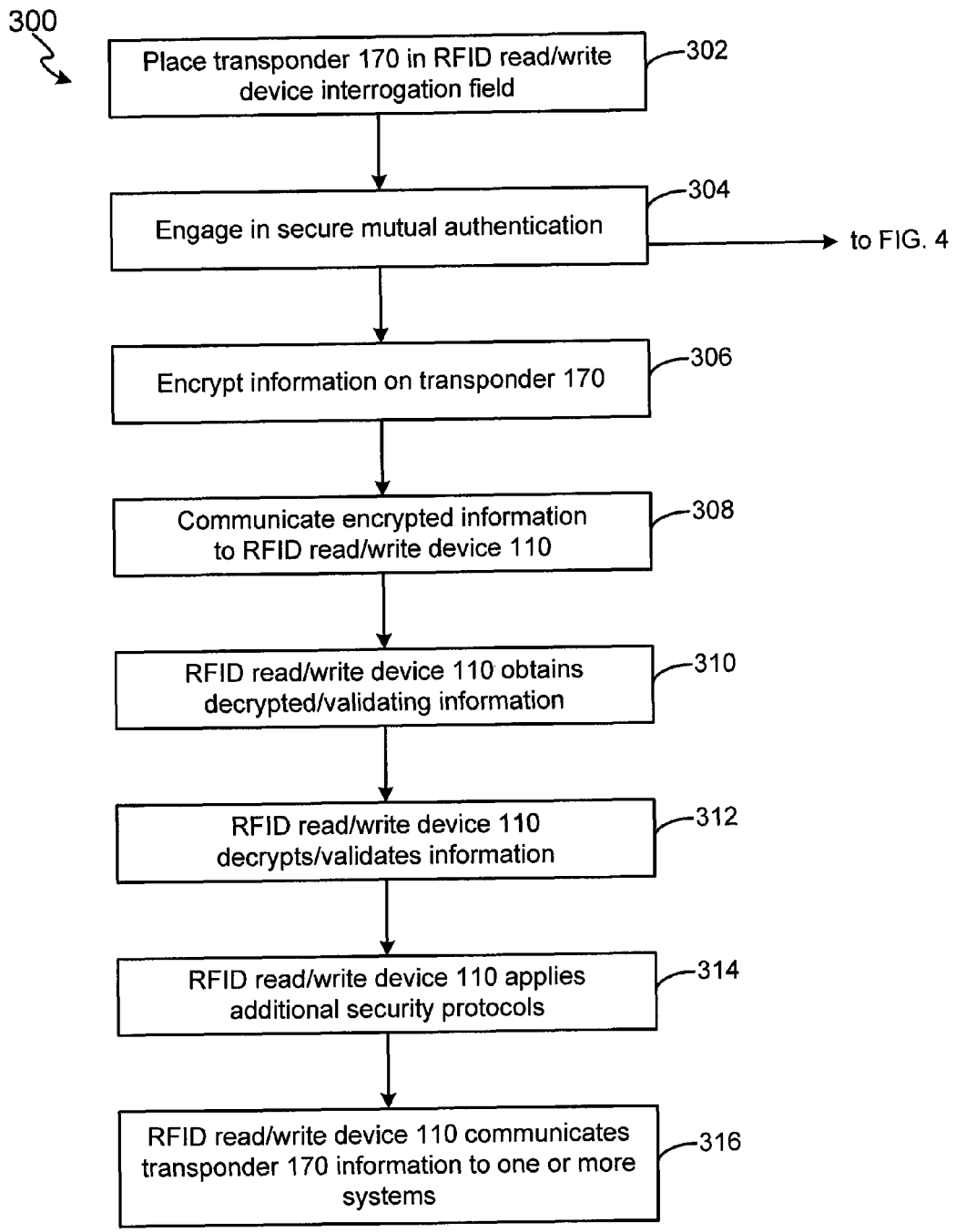
FIG. 3 illustrates an exemplary method for securing an RFID transaction in accordance with one embodiment of the invention.

Referring again to exemplary method 300 illustrated in FIG. 3, after secure mutual authentication, transponder 170 may encrypt information stored on the device (for example, using the method described in FIG. 2) (step 306) and communicate the encrypted information to RFID read/write device 110 (and/or vice versa) using additional secure transactions protocols (step 308). Alternatively and/or additionally, transponder 170 may secure information using one or more securing protocols described herein.

RFID read/write device 110 may then decrypt/validate the information (step 312) by communicating (step 310) with one or more certificate authorities 140, tag processing services 115 and/or TPS 105 to obtain the proper decryption/validating information. Alternatively, RFID read/write device 110 is configured with the proper decryption/validating information such that RFID read/write device 110 may apply the proper security protocol to decrypt/validate transponder 170 information.

RFID read/write device 110 may additionally be configured to communicate transponder 170 information to one or more additional devices or systems (for example, a merchant system or an issuer system) (step 316). As such, RFID read/write device is configured to employ one or more security protocols to encrypt and transmit transponder 170 information to the additional device or system (step 314) using one or more of the methods described herein.

In accordance with another aspect of the present invention, an RF transaction using transponder 170, RFID read/write device 110, and/or tag 150 (collectively "transaction devices") are secured by limiting the number of transactions which are performed with a particular transaction device. Once the maximum transactions value is reached, the transaction device may automatically disable itself against further usage.

In another exemplary embodiment, the transaction devices in accordance with the present invention may further include a transaction counter for recording and reporting the number of transactions performed with the particular transaction device. For a detailed explanation of a suitable counter for use with the invention, please refer to commonly-owned U.S. patent application Ser. No. 10/708,545, entitled "SYSTEM AND METHOD FOR SECURING RF TRANSACTIONS USING A RADIO FREQUENCY IDENTIFICATION DEVICE INCLUDING A TRANSACTIONS COUNTER," filed Mar. 10, 2004, incorporated by reference in its entirety.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments is realized and that logical and mechanical changes is made without departing from the spirit and scope of the invention. For example, the RFID reader may include an RFID reader encrypted identifier stored in the reader database, which is validated by the account issuer in similar manner as with the transaction device encrypted identifier. Moreover, the counter may increment the total transactions counted value by the predetermined incremental value at the completion of a successful transaction. In addition, the steps recited in any of the method or process claims is executed in any order and are not limited to the order presented. Further, the present invention is practiced using one or more servers, as necessary. Thus, the preceding detailed description is presented for purposes of illustration only and not of limitation, and the scope of the invention is defined by the preceding description, and with respect to the attached claims.

What is claimed is:

1. A method, comprising:
    receiving, by a transponder, an encrypted interrogation signal, an authentication code, and GPS information associated with a sender of the encrypted interrogation signal and the authentication code, wherein the encrypted interrogation signal is associated with the authentication code;
    activating the transponder in response to the receiving the encrypted interrogation signal and the authentication code;
    authenticating the sender of the encrypted interrogation signal by using the GPS information and by decrypting the encrypted interrogation signal; and
    in response to authenticating the sender of the encrypted interrogation signal,
    encrypting the authentication code, and
    transmitting the encrypted authentication code.

2. The method of claim 1, wherein the encrypted interrogation signal comprises a random code generated by an RFID device.

3. The method of claim 1, wherein the authentication code is associated with the transponder.

4. The method of claim 1, wherein the transponder comprises a transponder identification code.

5. The method of claim 4, wherein the encrypted authentication code is decryptable using a security authentication key unique to the transponder identification code.

6. The method of claim 1, wherein the transponder is configured with global positioning system (GPS) capability to be operable in a predetermined area.

7. The method of claim 6, further comprising deactivating the transponder in response to the GPS capability indicating the transponder has moved outside of the predetermined area.

8. The method of claim 1, further comprising receiving communications using a communications security protocol.

9. The method of claim 8, wherein the communications security protocol is an HTTPS protocol.

10. A transponder comprising:
    a receiver configured to receive an encrypted interrogation signal, a transponder authentication code, and GPS information associated with a sender of the encrypted interrogation signal and an authentication code;
    a processor configured to decrypt the encrypted interrogation signal to authenticate the sender of the authentication code,
       wherein the processor is further configured to use the GPS information to authenticate the sender of the encrypted interrogation signal;
       wherein the encrypted interrogation signal is associated with the transponder authentication code, and
       wherein the processor is further configured to encrypt the transponder authentication code in response to authenticating the sender of the encrypted interrogation signal; and
    a transmitter configured to transmit the encrypted transponder authentication code.

11. The transponder of claim 10, wherein the encrypted interrogation signal comprises a random code generated by an RFID device.

12. The transponder of claim 10, wherein the authentication code is associated with the transponder.

13. The transponder of claim 10, wherein the transponder comprises a transponder identification code.

14. The transponder of claim 13, wherein the encrypted authentication code is decryptable using a security authentication key unique to the transponder identification code.

15. The transponder of claim 10, wherein the transponder is configured with global positioning system (GPS) capability to be operable in a predetermined area.

16. The transponder of claim 15, wherein the processor is configured to deactivate the transponder in response to the GPS capability indicating the transponder has moved outside of the predetermined area.

17. A transponder including a tangible, non-transitory memory having instructions stored thereon that, in response to execution by the transponder, cause the transponder to perform operations, comprising:
    code for receiving, by the transponder, an encrypted interrogation signal, an authentication code, and GPS information associated with a sender of the encrypted interrogation signal and the authentication code, wherein the encrypted interrogation signal is associated with the authentication code;

code for activating the transponder in response to the receiving the encrypted interrogation signal and the authentication code;

code for authenticating the sender of the encrypted interrogation signal by using the GPS information and by decrypting the encrypted interrogation signal; and code for, in response to authenticating the sender of the encrypted interrogation signal,
encrypting the authentication code, and
transmitting the encrypted authentication code.

18. The transponder of claim 17, wherein the encrypted interrogation signal comprises a random code generated by an RFID device.

19. The transponder of claim 17, wherein the authentication code is associated with the transponder.

20. The transponder of claim 17, wherein the transponder comprises a transponder identification code.

21. The transponder of claim 20, wherein the encrypted authentication code is decryptable using a security authentication key unique to the transponder identification code.

22. The transponder of claim 17, wherein the transponder is configured with global positioning system (GPS) capability to be operable in a predetermined area.

23. The transponder of claim 22, further comprising code for deactivating the transponder in response to the GPS capability indicating the transponder has moved outside of the predetermined area.

24. A transponder comprising:
means for receiving, by the transponder, an encrypted interrogation signal, an authentication code, and GPS information associated with a sender of the encrypted interrogation signal and the authentication code;

means for activating the transponder in response to the receiving the encrypted interrogation signal and the authentication code;

means for authenticating the sender of the encrypted interrogation signal using the GPS information and by decrypting the encrypted interrogation signal in response to authenticating the sender of the encrypted interrogation signal; and means for encrypting the authentication code and means for transmitting the authentication code responsive to authenticating the sender of the encrypted interrogation signal.

25. The transponder of claim 24, wherein the encrypted interrogation signal comprises a random code generated by an RFID device.

26. The transponder of claim 24, wherein the authentication code is associated with the transponder.

27. The transponder of claim 24, wherein the transponder comprises a transponder identification code.

28. The transponder of claim 27, wherein the encrypted authentication code is decryptable using a security authentication key unique to the transponder identification code.

29. The transponder of claim 24, wherein the transponder is configured with global positioning system (GPS) means operable in a predetermined area.

30. The transponder of claim 29, further comprising means for deactivating the transponder in response to the GPS means indicating the transponder has moved outside of the predetermined area.

* * * * *